United States Patent [19]
Chatterjee et al.

[11] Patent Number: 6,112,197
[45] Date of Patent: Aug. 29, 2000

[54] METHOD AND APPARATUS FOR TRANSMISSION OF ROW DIFFERENCES

[75] Inventors: Debashish Chatterjee; Sreenivas Gollapudi, both of Fremont, Calif.

[73] Assignee: Oracle Corporation, Redwood Shores, Calif.

[21] Appl. No.: 09/086,753

[22] Filed: May 29, 1998

[51] Int. Cl.$^7$ .................................................. G06F 17/30
[52] U.S. Cl. ................................. 707/3; 707/3; 707/10; 707/101; 707/201; 711/103
[58] Field of Search .............................. 707/2–5, 10, 102, 707/101, 201; 711/103, 112

[56] References Cited

U.S. PATENT DOCUMENTS

| | | | |
|---|---|---|---|
| 5,043,872 | 8/1991 | Cheng et al. | 707/2 |
| 5,479,654 | 12/1995 | Squibb | 707/201 |
| 5,495,608 | 2/1996 | Antoshenkov | 707/3 |
| 5,625,813 | 4/1997 | Venn | 707/2 |
| 5,659,794 | 8/1997 | Caldarale et al. | 707/1 |
| 5,664,172 | 9/1997 | Antoshenkov | 707/4 |
| 5,826,253 | 10/1998 | Bredenberg | 707/2 |
| 5,826,270 | 10/1998 | Rutkowski et al. | 707/10 |
| 5,848,409 | 12/1998 | Ahn | 707/3 |
| 5,895,463 | 4/1999 | Dowling et al. | 707/3 |
| 5,903,888 | 5/1999 | Cohen et al. | 707/3 |
| 6,006,232 | 12/1999 | Lyons | 707/101 |

OTHER PUBLICATIONS

Graefe, G., "The Microsoft Relational Engine", Proceedings of the Twelfth International Conference on Data Engineering, 1996., Feb. 26–Mar. 1, 1996, pp. 160–161.

Gavish, Bezalel, "Set Query Optimization in Distributed Database Systems", ACM Transactions on Database Systems, vol. 11, No. 3, Sep. 1986, pp. 265–293.

Stallings, William, "SNMP-based network management: Where is it headed?", Telecommunications, Dedham; vol. 27, Issue 6, Jun. 1993, p. 57.

Primary Examiner—Kim Yen Vu
Assistant Examiner—Shahid Alam
Attorney, Agent, or Firm—McDermott, Will & Emery

[57] ABSTRACT

A method and apparatus for is provided for efficiently transmitting multiple rows of data to a client station. The client station generates a query that is transmitted to a remotely located server, which in turn generates a query result. The server transmits the first row of data from the query result to the client. The remaining rows of data are transmitted by first calculating the difference between successive rows of data. Next, the server sends only the unique rows resulting from the calculated row difference to the client. The server also send an indication of the number of non-repeated value columns detected in order to allow reconstruction of the query result by the client station.

37 Claims, 5 Drawing Sheets

TABLE A

|  | Col 1 | Col 2 | Col 3 | ... | Col n |
|---|---|---|---|---|---|
| Row 1 | | | | | |
| Row 2 | | | | | |
| Row 3 | | | | | |
| . | | | ... | | |
| Row k | | | | | |

TABLE B

|  | Col 1 | Col 2 | ... | Col m |
|---|---|---|---|---|
| | | | | |
| | | | | |
| | | ... | | |
| | | | | |

TABLE C n + m columns

|  | Col 1 | Col 2 | ... | Col n | | Col 1 | ... | Col m |
|---|---|---|---|---|---|---|---|---|
| row 1 | Row 1 of | Table A | | | + | Row 1 of | Table B | |
| row 2 | Row 1 of | Table A | | | + | Row 2 of | Table B | |
| | Row 1 of | Table A | | | + | Row 3 of | Table B | |
| | Row 1 of | Table A | | | + | Row 4 of | Table B | |
| . | | | | | | | | |
| . | | | | | | | | |
| . | | | | | | | | |
| rowk*k-2 | Row k of | Table A | | | + | Row k-2 of | Table B | |
| row k*k-1 | Row k of | Table A | | | + | Row k-1 of | Table B | |
| rowk*k | Row k of | Table A | | | + | Row k of | Table B | |

METHOD AND APPARATUS FOR TRANSMISSION OF ROW DIFFERENCES

FIELD OF THE INVENTION

The present invention relates to database management systems and more particularly to a method and apparatus for efficiently transmitting query results from a database server to a client station.

BACKGROUND OF THE INVENTION

In typical database systems, users submit commands to a database server using a database application. The commands submitted to the database server allow the user to store, update, and retrieve information. To be correctly processed, the commands must comply with the database language that is supported by the database server. One popular database language is known as the Structured Query Language (SQL). As commands are executed by the database server, logical units of work are created. A logical unit of work that is comprised of one or more database language statements is referred to as a transaction.

In networked environments, a database server often performs query processing for queries submitted by remotely located client stations. The database server processes each query and generates a query result that satisfies the criteria defined by a particular query. The query result must subsequently be transferred to the client station from which the query originated.

In certain instances, the query submitted by a client station involves the joining of two or more relatively large tables. Other times, the query is designed to retrieve relatively redundant tables, in other words, a table that contains a significant amount of data repeated across multiple rows. During the transmission of the results of such queries, much of the network transmission time is used to support transfer of redundant data. This problem becomes increasingly costly as the size of the query result increases and/or the amount of redundant data increases.

FIG. 6 illustrates an example of a join operation between two relatively wide tables and the resulting table, according to conventional methods. A wide table is a table that contains a large number of columns per row. In FIG. 6, reference numerals 610 and 612 represent a first and second wide table, namely table A and table B, respectively. As shown in FIG. 6, table A 610 contains k rows and n columns, where n and k are potentially large integers. Table B 612 contains m columns, where m is a potentially large integer. For simplicity, table B 612 is selected such that it contains the same number of rows as table A 610. An unrestricted join of table A 610 with table B 612 results in a third table, namely table C, indicated by reference numeral 614. Table C 614 contains k*k rows, that correspond to the number of rows contained in table A 610 multiplied by the number of rows contained in table B 612. Table C 614 contains n+m columns, that correspond to the number of columns contained in table A 610 plus the number of columns contained in table B 612.

A fetch of multiple rows from the resulting join operation, i.e. table C 614, would return information in the form of a matrix having an order: row 1 of table A 610 plus row 1 of table B 612; row 1 of table A 610 plus row 2 of table B 612; . . . ; row 1 of table A 610 plus row k of table B 612, depending on the number of rows required. As shown in FIG. 6, if table C 614 is retrieved in its entirety, the first k rows fetched would have row 1 of table A 610 in common. Since row 1 of table A 610 is common to the first k rows, it should be readily apparent that retransmission of the same data will increase traffic over the network. In particular, when row 1 of table A 610 is sufficiently large (e.g., contains a large number of columns), the amount of time required to transmit redundant information can have a serious effect on system performance.

Based on the foregoing, a disadvantage associated with current methods of executing queries on a remote server is the increased amount of time required to transmit information that result from operations where the tables contain a substantial amount of data that is repeated across multiple rows.

SUMMARY OF THE INVENTION

Accordingly, there is a need for methods and apparatus that reduce the amount of time required to transmit tables containing a substantial amount of data that is repeated across multiple rows.

These and other needs are addressed by the present invention, wherein a database server transmits only the difference in data contained in successive rows, thereby eliminating the need to transmit redundant data that is repeated across multiple rows.

In accordance with one aspect of the present invention, a method for transmitting multiple rows of data to a client station based on a query result generated by a remote server includes receiving a query from a client station, and generating the query result based on the received query. A first row of data from the query result is then transmitted to the client station. Next, row differences are calculated between successive rows of data contained in the query result. The calculated row differences are then transmitted to the client station.

Transmitting row differences in this manner allows the client station to reconstruct the query result based on the received first row of data and the received row differences. By calculating the difference between successive rows of data, the present invention effectively reduces the amount of redundant data that must be transmitted over the network. Hence, processing speed and network efficiency are improved.

According to one embodiment of the invention, the row differences between successive rows of data are calculated by scanning a currently active row of data from the query result, and scanning a previous row of data from the query result. Next, the content of each column in the currently active row of data is compared to the content of each corresponding column in the previous row of data. Thus, the difference between successive rows of data may be efficiently calculated with minimal memory requirements by examining corresponding columns in each row.

According to a specific embodiment of the invention, during calculation of the row differences, the value of a counter that indicates the number of common columns detected in the currently active row of data is incremented if the content of a compared column in the currently active row of data is equal to the content of a corresponding column in the previous row of data. If the content of a compared column in the currently active row of data is not equal the content of a corresponding column of the previous row of data, then the row differences are transmitted. Hence, once a difference in the column values is discovered, only the remaining columns are sent to the client station. The value of the counter may be subsequently used to reconstruct the entire row of data based on the previous row of data received.

In accordance with another aspect of the invention, a computer-readable medium carries one or more sequences of instructions specifically designed to transmit multiple rows of data to a client station based on a query result generated by a remote server. The one or more sequences of instructions are subsequently executed by one or more processors to cause the one or more processors to transmit a first row of data of the query result from the remote server to the client station. Row differences are then calculated between successive rows of data contained in the query result. Next, the calculated row differences are transmitted to the client station. Additional rows of the query result are reconstructed by the client station, based on the first row of data and the received row differences. The computer readable medium provides persistent storage and easy transport of the instructions necessary to calculate the difference between successive rows of data, and thereby effectively reduce the amount of redundant data that must be transmitted over the network.

In accordance with another aspect of the invention, a system for transmitting at least one row of data based on a query result comprises a client station configured to generate a query and a remotely located server for receiving the query generated by the client station. The server generates a query result having at least one row of data based on the received query, and transmits the first row of data of the query result to the client station. The server calculates row differences between successive rows of data contained in the query result, and transmits the calculated row differences to the client station. In addition, the client station is further configured to reconstruct the query result based on the received row of data and the received row differences. Hence, the amount of redundant data that must be transmitted over the network can be effectively reduced.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A, 6B and 6C are block diagrams illustrating a join operation according to the prior art.

DETAILED DESCRIPTION OF THE PREFERRED EMBODIMENT

A method and apparatus for transmitting multiple rows of data to a client station based on a query result generated by a remote server is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
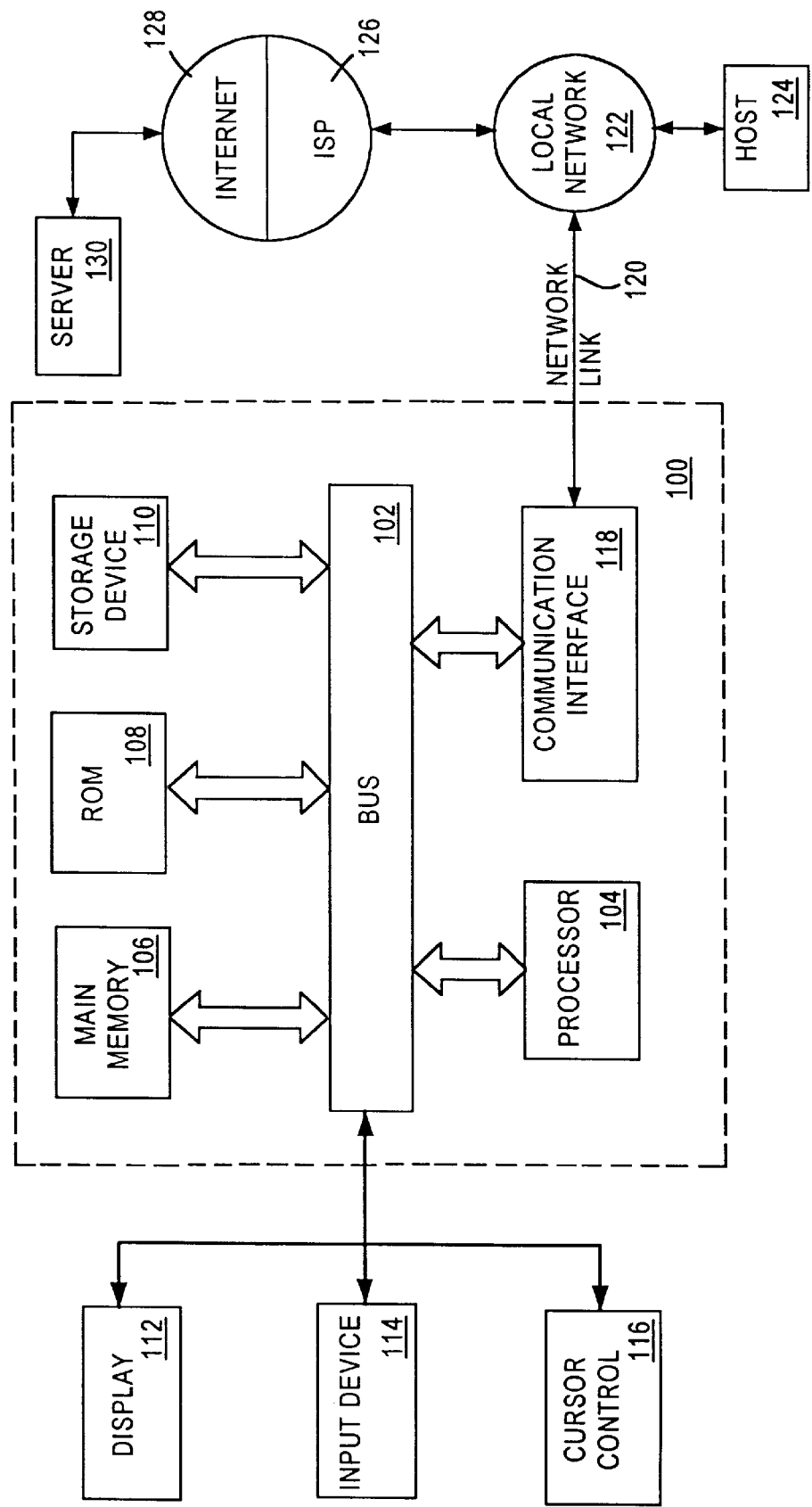
FIG. 1 is a block diagram illustrating a computer system that may be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for efficiently transmitting multiple rows of data based on a query result. According to one embodiment of the invention, the rows of data are transmitted by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might receive a query request from a user and transmit a query result through Internet 128, ISP 126, local network 122 and communication interface 118. In accordance with the invention, the amount of redundant data in one such query result may be effectively reduced by calculating the difference between successive rows of data and transmitting only the unique data to the user, as described herein.

The received code may be executed by processor 104 as it is received, and/or stored in storage device 110, or other non-volatile storage for later execution. In this manner, computer system 100 may obtain application code in the form of a carrier wave.

EXEMPLARY SYSTEM

Figure 2:
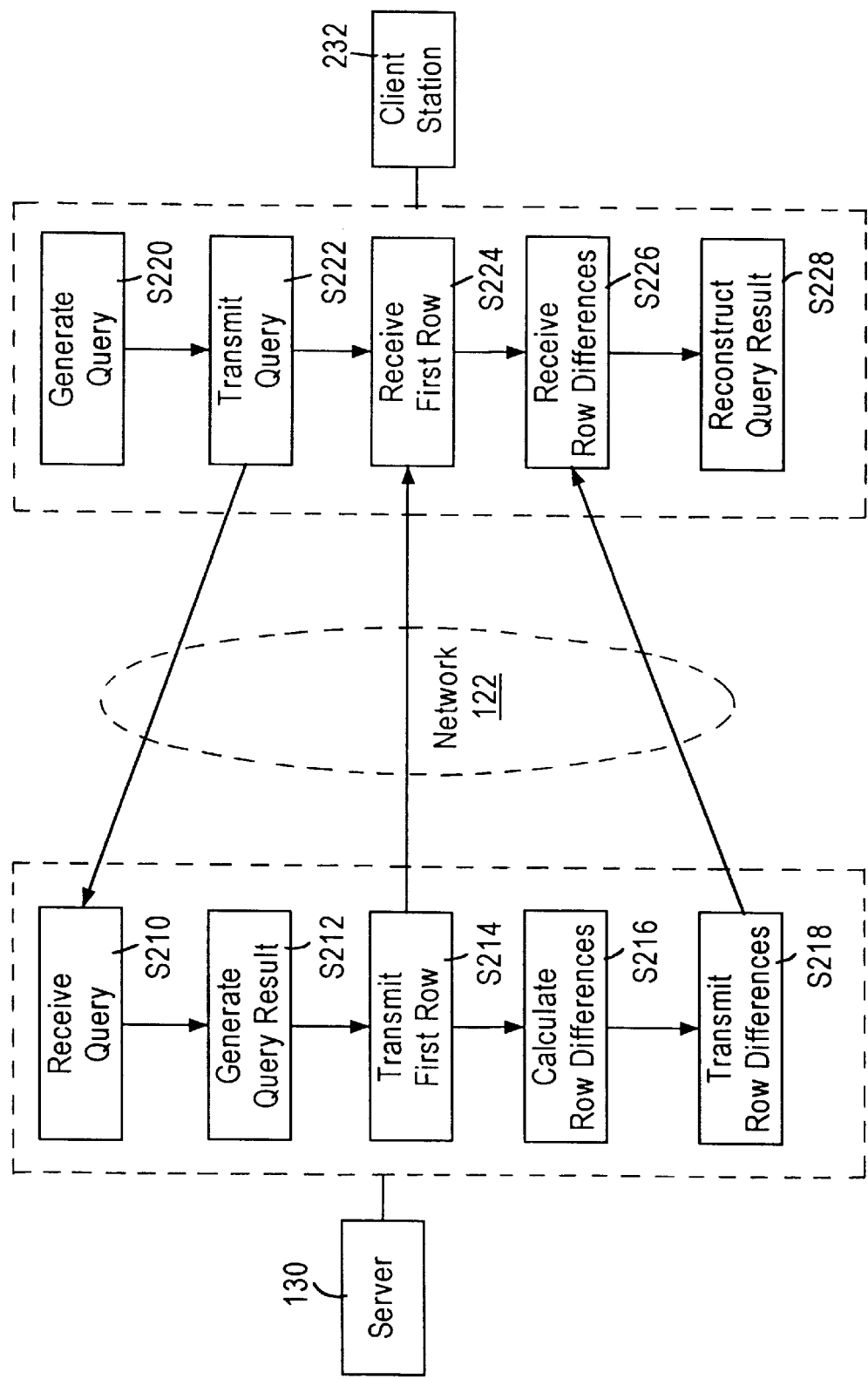
FIG. 2 is a process diagram illustrating the steps performed by a server and a client during transmission of data according to an embodiment of the present invention.

FIG. 2 is a process diagram illustrating transmission of multiple rows of data according to an embodiment of the present invention. According to the embodiment illustrated in FIG. 2, a server 130 communicates with a client station 232 by transmitting data over a local network 122. However, in other embodiments the exchange of data may take place over various network entities such as a LAN, a Wide Area Network (WAN), the Internet 128, etc., or a combination of such network entities.

At step S210, the server 130 receives a query pertaining to data contained on a persistent storage device associated with the server 130. The query is evaluated by the server 130 and a query result is generated at step S212. The query result generated is typically in the form of a set of one or more rows of data that satisfy the received query.

At step S214, the server 130 reads the first row of data from the query result that has been generated, and transmits the first row of data. At step S216, row differences between successive rows of data are calculated by the server 130. Specifically, a first "row difference" is calculated by the server 130 based on the first row of data (that has previously been transmitted) and the second row of data. A second "row difference" is then calculated by the server 130 based on the second row of data and the third row of data. This process proceeds for each subsequent row in the query result, resulting in a "row difference" for each row beyond the first row.

The server 130 may maintain an area in a dynamic memory, such as a buffer, for storing one or more rows of data that have already been read. For example, when the first row of data is read by the server 130, a copy of the first row of data is temporarily saved in the buffer. The buffer may be dynamically allocated to accommodate the number of columns contained in the row of data stored therein, and to store multiple rows of data.

Accordingly, when the second row of the query result is retrieved by server 130, it is moved to either dynamically allocated space within the buffer, or into a second buffer. At step S218, the row differences are transmitted by the server 130 to the client station 232.

Calculation and transmission of the row differences may be accomplished in several ways. As illustrated in steps S216 and S218, the row differences are first calculated, and then transmitted. However, each calculated row difference may be immediately transmitted prior to calculation of a subsequent row difference. Hence, the amount of memory allocated to the buffer can be minimized. Steps S210 to S218 are performed locally by the server 130.

The client station 232 generates a query at step S220 by entering a series of commands from a database language such as the Structured Query Language (SQL) using an input device such as an alphanumeric keyboard. Alternatively, the query may be entered from, or issued by, an application currently executing on the client station 232. Once generated, the client station 232 transmits the query at step S222. At step S224, the first row of data is received by the client station 232. Similar to the server 130, the client station 232 may also be configured to reserve a buffer in a dynamic memory area. Accordingly, the first row of data received is copied to the buffer.

At step S226, a plurality of row differences are received by the client station 232. At S228, the client station 232 reconstructs a query result, resulting from the transmitted query, based on the first row of data received and the row differences received. The client station's buffer may be dynamically allocated to allow storage of multiple row differences, hence allowing unimpeded reconstruction of the query result.

In synchronous operation between the client station 232 and the server 130, an appropriate connection is remotely established using the network 122. Once the connection is established, the client station 232 generates the query at step S220 and transmits the generated query to the server 130 at step S222. At step S210, the server 232 receives the query and processes the statements contained therein. The query result is then generated at step S214, in the form of a set of rows.

The first row of the query result is transmitted to the client station 232 at step S214. The client station 232 receives the first row of the query result at step S224. Next, the server 130 initiates calculation of the row differences, at step S216, between the first and second rows of data, and subsequent successive rows of data contained in the query result. At step S218, the server 130 transmits the row differences to the client station 232. The client station 232 receives the row differences at step S226, and reconstructs the query result at step S228.

Figure 3:
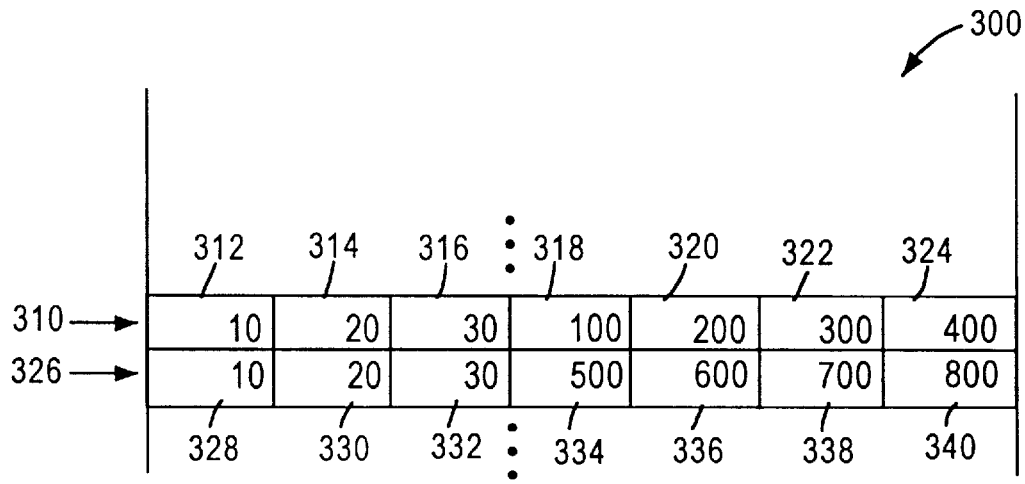
FIG. 3 is a block diagram illustrating a portion of a table and the difference between two successive rows.

FIG. 3 illustrates a portion of a table 300 and the data stored in two of the rows therein. As shown in FIG. 3, a first row 310 and a second row 326 from the table 300, each include seven (7) columns. The columns of the first row 310 are respectively indicated by the numerals 312, 314, 316, 318, 320, 322, and 324. The columns of the second row 326 are respectively indicated by the numerals 328, 330, 332, 334, 336, 338, 340.

Depending on the nature of the query received by the client station 232, there may be no relationship between the values in consecutive rows of the result set of the query. However, for certain queries, such as queries that require unrestricted joins, there may be a relationship between values in consecutive rows. Specifically, in consecutive rows created by unrestricted joins, several columns may contain identical data. As shown in FIG. 3, column one 312, column two 314, and column three 316 of the first row 310 contain identical data, respectively, as column one 328, column two 330, and column three 332 of the second row 326.

The remaining columns of the first row 316 are different from the respective remaining columns of the second row 326. In an unrestricted join of two relatively large tables, the number of columns that have values repeated from the previous row ("repeated value columns") may exceed one thousand (1000). Additionally, in an unrestricted join of a relatively large table with a relatively small table (less than 100 rows), the number of repeated value columns may be many times greater than the number of non-repeated value columns.

According to the present invention, the server 130 generates a query result and transmits the first row 310 to the client station 232. Next, rather than transmitting the entire second row 326, the server 130 detects the first column that differs from the corresponding column in the first row 310. Once a unique column is detected, all subsequent columns are transmitted to the client station 232. According to FIG. 3, the server 130 would transmit the fourth column 334, the fifth column 336, the sixth column 338, and the seventh column 340 of the second row 326.

In order to calculate the difference between two successive rows, such as the first row 310 and the second row 326, the server 130 compares the content of corresponding columns. This may be accomplished, for example, by first selecting a counting variable to address the columns. The counting variable is used in conjunction with both the first row 310 and the second row 326. For a value of k (corresponding to the counting variable), the server 130 compares the value of the kth column of the first row 310 to the value of the kth column of the second row 326. The value of the counting variable is sequentially incremented until two different values are obtained. At this point, all subsequent columns are transmitted to the client station 232 whether or not any unique columns exist.

According to an embodiment of the present invention, the server 130 transmits a counter to the client station 232, that indicates the number of common columns. The counter may simply be, for example, the current value of the counting variable used by the server 130 to compare the columns. The client station 232 receives the counter and retrieves a number of columns, equal to the value of the counter, from the last row received (i.e., the first row 310). According to the exemplary embodiment of FIG. 3, the value of the counter would be three (3). Hence, the client station 232 retrieves the first three columns from the first row 310. The columns retrieved from the first row 310 are used to reconstruct the second row, and may be stored in a predetermined dynamic memory area such as a buffer. The retrieved columns may also be stored directly to a persistent storage device.

Next, the client station 232 receives the fourth column 334, the fifth column 336, the sixth column 338, and the seventh column 340 of the second row 326 from the server 130. These columns are successively appended to the columns being used to reconstruct the second row, hence resulting in an exact duplicate of the row of data generated by the server 130. If the server 130 detects that all the columns of the second row 326 are common to the columns of the first row 310, then no row difference is transmitted to the client station 232. The value of the counter would equal the total number of columns in the second row 326, i.e., seven (7). Accordingly, the client station 232 would copy the contents of all columns in the first row 310 in place of corresponding columns in the second row during the reconstruction process.

Figure 4:
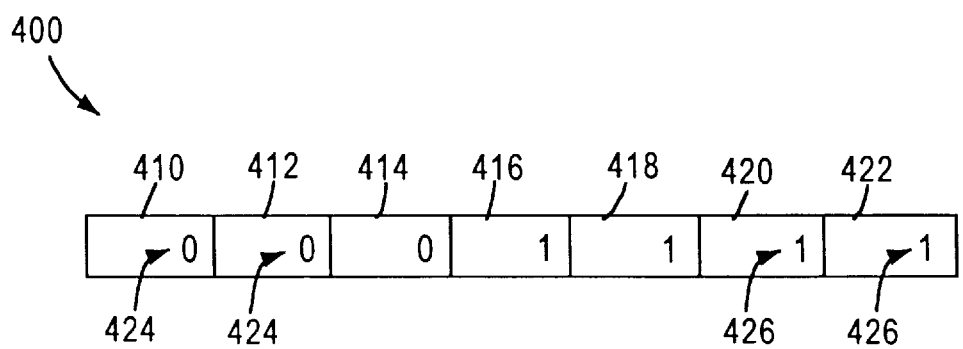
FIG. 4 is a block diagram illustrating an exemplary structure for a bit vector used to indicate the difference between the two successive rows shown in FIG. 3.

According to another embodiment of the present invention, the server 130 examines all columns of the second row 326, and transmits only the non-repeated value columns. FIG. 4 illustrates an exemplary structure for a bit vector 400 that may be generated by the server 130 and transmitted to the client station 232 in order to indicate the difference between two successive rows. The bit vector 400 contains seven columns respectively indicated by the numerals 410, 412, 414, 416, 418, 420, and 422. Each column in the bit vector 400 has a one to one correspondence with the columns of current row (e.g., the second row 326). As shown in FIG. 4, each column in the bit vector 400 can store either a first value 424 (such as zero), or a second value 426 (such as one). The first value 424 indicates that the value of the corresponding column in the current row is the same as the value of the same column from the previous row. The second value 426 indicates that the value of the corresponding column in the current row is different from the value of the same column of the previous row.

In order to calculate the difference between the first row 310 and the second row 326 according to this embodiment, the server 130 compares the content of corresponding columns. Again, this may be accomplished by selecting a counting variable to address the columns. The counting variable is used in conjunction with both the first row 310 and the second row 326. For a value of k, the server 130 compares the value of the kth column of the first row 310 to the value of the kth column of the second row 326. The value of the counting variable is sequentially incremented until all columns are compared. The difference between the first row 310 and the second row 326, would thus be defined as the columns in the second row 326 that are different from the corresponding columns in the first row 310.

Accordingly, every column in the second row 326 is compared to the corresponding column in the first row 310. This embodiment of the invention eliminates the possibility of transmitting values from repeated value columns, however, there is an increase in computational effort relative to the approach in which values from all subsequent columns are sent when the first non-repeating value column of a row is encountered. When the server 130 only detects the first non-repeated value column, computational time is decreased, particularly in large tables. However, there is a possibility that values from some repeated value columns will be transmitted.

Referring to FIG. 4, the first three columns of the bit vector 400 each contain the first value (i.e. 0). The next four columns of the bit vector 400 each contain the second value (i.e. 1). When the client station 232 receives the bit vector 400, each column is examined. If a column in the bit vector 400 contains the first value 424, then the respective column of the previous row received(e.g. first row 310) is copied to the respective column of the next row being reconstructed. Once a row has been reconstructed, it becomes the "previous row" relative to the next row received from the server.

Figure 5:
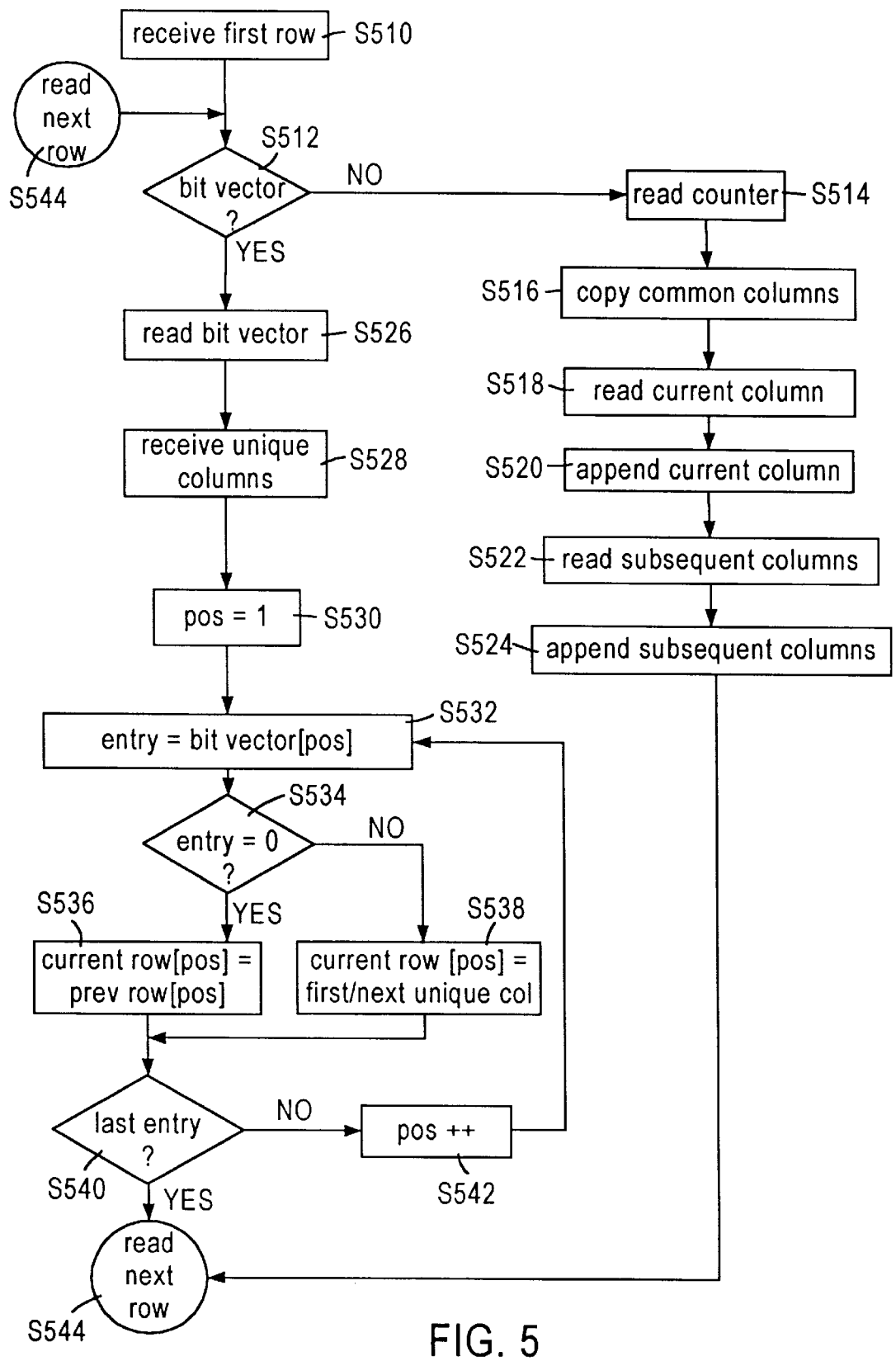
FIG. 5 is a flowchart illustrating the steps performed during reconstruction of a query result.

FIG. 5 is a flow chart illustrating the steps performed by the client station 232 during reconstruction of a query result. At step S510, the first row of data from the query result is received from the server 130. At step S512, the client station 232 determines if a bit vector 400 is being used. If a bit vector 400 is not in used, then the client station 232 proceeds to step S514. The client station 232 performs this test in order to determine if all the columns have been compared. Accordingly, a flag or similar logical variable can also be used to indicate the type of comparison performed by the server 130.

Alternatively, the client station 232 and server 130 may negotiate the type of comparison that will be performed while a connection through the network is being established. Thus, if a bit vector 400 is being used, the client station 232 would perform step S510 followed by step S526, and proceed to step S544. If a bit vector 400 is not being used, the client station 232 would perform step S510 followed by step S514, and proceed to step S544.

At step S514, the client station 232 receives the counter from the server 130 and examines its value. At step S516, the client station 232 reads values from a number of columns of the first row 310, based on the value of the counter, and copies the values to a buffer, referred to herein as the "construction buffer". The construction buffer is used as temporary storage for column values read from the first row 310. Columns values received from the server 130 as part of the row difference are also stored in the construction buffer until the entire second row can be successfully reconstructed.

The current column is read at step S518. The current column is appended to the construction buffer at step S520. At step S522, subsequent columns are read by the client station 232. At step S524, all subsequent columns are appended to the construction buffer. At this point, the construction buffer contains an exact copy of the second row 326. According to the disclosed embodiment, the current column is the first column that the server 130 detects to be different from the previous row. Since the value stored in this column has already been retrieved by the server 130, it may be transmitted to the client station 232 independently. Alternatively, all columns that are different may be transmitted consecutively, thus eliminating steps S518 and S520. At step S544, the next row is read and the process is repeated.

If a bit vector 400 is being used, then the bit vector 400 is read at step S526. All non-repeated value columns resulting from the difference between the first row 310 and the second row 326 are received at step S528. The client station 232 creates a location variable, such as "pos" at step S530, and assigns an initial value (such as "1") to the location variable. The location variable is used as a reference to the columns of the bit vector 400, the first row 310, and the second row 326.

At step S532, the value of the bit vector 400 corresponding to the value identified by the location variable "pos" is assigned to a variable, arbitrarily named "entry". At step S534, the client station 232 examines the value of the entry variable. If the value is zero, then the current column of the second row 326 is common with the first row 310. The client station 232 proceeds to step S536, where the value of the current column in the first row 310 is assigned to the current column of the second row 326. If the value is not zero, then the current column of the second row 326 differs from that ofthe first row 310. The client station 232 proceeds to step S538, where the value from the first (or next) non-repeated value column transmitted from the server 130 is assigned to the current column of the second row 326, which is identified by the location variable. At step S540, the client station 232 examines the value of the location variable "pos" in order to determine if the last column in the bit vector 400 has been reached. If the last column has not been reached, the client station 232 proceeds to step S542.

At step S542, the value of the location variable is incremented by one and the client station 232 returns to step S532, where the value stored in the next column of the bit vector 400 is assigned to the entry variable. If the last column has been reached, the client station 232 proceeds to step S544 and reads the next row. As the columns are read, the client station 232 may use a construction buffer to store values until the query result is reconstructed. Additionally, once a row is reconstructed, it may be moved from the construction buffer to a persistent storage device in the form of a data file. Subsequent rows are appended to the data file until the last row is reconstructed and appended to the data file. At this point, the data file represents a duplicate of the query result.

The techniques described herein allow the results of a query to be transmitted from a server to a client station while using significantly less bandwidth than prior approaches. Bandwidth savings increase with the number of repeated values in the result set of the query, while decreasing the cost associated with transmission. Consequently, these techniques yield substantial savings for queries that frequently result in repeated column values, such as unrestricted joins.

In the foregoing specification, the invention has been described with reference to specific embodiments thereof. It will, however, be evident that various modifications and changes may be made thereto without departing from the broader spirit and scope of the invention. For example, in some embodiments a "row difference" might be expressed as a series of numbers, each number corresponding to a respective column and representing the difference between the value stored for the column in a first row and the value stored for the column in a second row [e.g. the difference between rows [5,2] and [4,0] would be expressed as 1,2]. The specification and drawings are, accordingly, to be regarded in an illustrative rather than a restrictive sense.

What is claimed is:

1. A method for transmitting multiple rows of data to a client station based on a query result generated by a remote server, the method comprising the steps:

receiving a query from a client station;

generating the query result based on the received query;

transmitting a first row of data from the query result to the client station;

calculating row differences between successive rows of data contained in the query result; and transmitting the calculated row differences to the client station, thereby allowing the client station to reconstruct the query result based on the received first row of data and the received row differences.

2. The method of claim 1 wherein the step of calculating the row differences between successive rows of data includes the step of detecting the number of repeated value columns between the successive rows of data.

3. The method of claim 2 wherein the step of transmitting the calculated row differences includes the step of indicating the number of repeated value columns detected by the remote server.

4. The method of claim 1 wherein the step of calculating the row differences between successive rows of data comprises the steps:

scanning a currently active row of data from the query result;

scanning a previous row of data from the query result; and comparing the content of each column in the currently active row of data to the content of each corresponding column in the previous row of data.

5. The method of claim 4 further comprising the steps:

if the content of a compared column in the currently active row of data is equal to the content of a corresponding column in the previous row of data, then incrementing the value of a counter that indicates the number of repeated value columns detected in the currently active row of data; and if the content of a compared column in the currently active row of data does not equal the content of a corresponding column of the previous row of data, then performing the step of transmitting the calculated row differences.

6. The method of claim 5 wherein the step of transmitting the calculated row differences includes the steps:

transmitting the counter to the client station;

transmitting a current column in the currently active row of data to the client station; and transmitting all subsequent columns in the currently active row of data to the client station.

7. The method of claim 4 wherein the step of transmitting the calculated row differences further includes the steps:

determining if the content of all columns in the currently active row of data equal the content of all corresponding columns in the previous row of data; and if all columns in the currently active row of data are equal, then transmitting a flag to the client station to indicate that all columns in the currently active row are common to the columns in the previous row of data.

8. The method of claim 1 wherein the step of calculating a row difference between successive rows of data comprises the steps:

scanning a currently active row of data from the query result;

scanning a previous row of data from the query result; and generating a bit vector containing a plurality of entries corresponding to the number of columns in the currently active row of data.

9. The method of claim 8 further comprising the steps:

comparing the content of each column in the currently active row of data to the content of each corresponding column in the previous row of data stored in the previous row buffer;

if the content of a compared column in the currently active row of data is equal to the content of a corresponding column in the previous row of data, then storing a first value in the corresponding entry of the bit vector; and if the content of a compared column in the currently active row of data does not equal the content of the corresponding column of the previous row of data, then storing a second value in the corresponding entry of the bit vector.

10. The method of claim 9 wherein the step of transmitting the calculated row differences comprises the steps:

transmitting the bit vector to the client station; and transmitting, to the client station, columns from the currently active row of data that are not equal to corresponding columns in the row of data.

11. A method for receiving multiple rows of data from a remote server comprising the steps:

generating a query by a client station;

transmitting the query to the server;

receiving a first row of data from a query result generated by the server based on the transmitted query;

receiving calculated row differences from the server; and reconstructing the query result generated by the server, based on the received first row of data and the received row differences.

12. The method of claim 11 wherein the step of receiving calculated row differences includes the steps:

receiving a counter that indicates the number of repeated value columns detected in a currently active row of data;

receiving a current column from the currently active row of data; and receiving all subsequent columns from the currently active row of data.

13. The method of claim 12 wherein the step of reconstructing further comprises the steps:

copying a plurality of columns, equal to the value of the received counter, from the received row of data to a buffer; and appending the received subsequent columns to the plurality of columns stored in the buffer in order to reconstruct the currently active row of data in the query result.

14. The method of claim 11 wherein the step of receiving calculated row differences further includes a step of receiving a flag that indicates that all columns in a currently active row are common to columns in a previous row of data.

15. The method of claim 11 wherein the step of receiving calculated row differences includes the steps:

receiving a bit vector containing a plurality of entries corresponding to the number of columns in a currently active row of data, each entry storing a value that indicates whether a content of the currently active row of data is equal to the content of a corresponding column in a previously received row of data; and receiving columns from the currently active row of data that are not equal to corresponding columns in the previously received row of data.

16. The method of claim 15 wherein the step of reconstructing comprises the steps:

examining the content of each entry of the received bit vector;

if an examined entry contains a first value then performing the steps: retrieving a value stored in a corresponding column of the previously received row of data, and storing the retrieved value in a column of a buffer; and if an examined entry contains a second value then performing the steps:
retrieving a value stored in a corresponding column of the received row difference, and
storing the retrieved value in a column of the buffer.

17. A computer-readable medium carrying one or more sequences of instructions for transmitting multiple rows of data to a client station based on a query result generated by a remote server, wherein execution of the one or more sequences of instructions by one or more processors causes the one or more processors to perform the steps of:

transmitting a first row of data of the query result from the remote server to the client station;

calculating row differences between successive rows of data contained in the query result; and transmitting the calculated row differences to the client station;

thereby allowing the client station to reconstruct the query result based on the received first row of data and the received row differences.

18. The computer readable medium of claim 17 wherein the step of calculating the row differences between successive rows of data includes the step of detecting the number of repeated value columns between the successive rows of data.

19. The computer readable medium 18 wherein the step of transmitting the calculated row differences includes the step of indicating the number of repeated value columns detected by the remote server.

20. The computer readable medium of claim 19 wherein the step of calculating row differences between successive rows of data comprises the steps:

scanning a currently active row of data from the query result;

scanning a previous row of data from the query result; and comparing the content of each column in the currently active row of data to the content of each corresponding column in the previous row of data.

21. The computer readable medium of claim 20 wherein:
the previous row of data is stored into a first buffer; and
the currently active row of data is stored into a second buffer.

22. The computer readable medium of claim 20 further comprising the steps:

if the content of a compared column in the currently active row of data is equal to the content of a corresponding column in the previous row of data, then incrementing the value of a counter that indicates the number of repeated value columns detected in the currently active row of data; and if the content of a compared column in the currently active row of data does not equal the content of a corresponding column of the previous row of data, then performing the step of transmitting the calculated row differences.

23. The computer readable medium of claim 22 wherein the step of transmitting the calculated row differences includes the steps:

transmitting the counter to the client station;

transmitting a current column in the currently active row of data to the client station; and transmitting all subsequent columns in the currently active row of data to the client station.

24. The computer readable medium of claim 23 wherein the step of reconstructing further comprises the steps:

copying a plurality of columns, equal to the value of the received counter, from the received row of data to a buffer; and appending the received subsequent columns to the plurality of columns stored in the buffer in order to reconstruct the currently active row of the query result.

25. The computer readable medium of claim 20 wherein the step of transmitting the calculated row differences further includes the steps:

determining if the content of all columns in the currently active row of data equal the content of all corresponding columns in the previous row of data; and if all columns in the currently active row of data are equal, then transmitting a flag to the client station to indicate that all columns in the currently active row are common to the columns in the previous row of data.

26. The computer readable medium of claim 17 wherein the step of calculating row differences between successive rows of data comprises the steps:

scanning a currently active row of data from the query result;

scanning a previous row of data from the query result; and generating a bit vector containing a plurality of entries corresponding to the number of columns in the currently active row of data.

27. The computer readable medium of claim 26 further comprising the steps:

comparing the content of each column in the currently active row of data to the content of each corresponding column in the previous row of data;

if the content of a compared column in the currently active row of data is equal to the content of a corresponding column in the previous row of data, then storing a first value in the corresponding entry of the bit vector; and if the content of a compared column in the currently active row of data does not equal the content of the corresponding column of the previous row of data, then storing a second value in the corresponding entry of the bit vector.

28. The computer readable medium of claim 27 wherein the step of transmitting the calculated row differences comprises the steps:

transmitting the bit vector to the client station; and transmitting to the client station columns from the currently active row of data that are not equal to corresponding columns in the previous row of data.

29. The computer readable medium of claim 28 wherein the step of reconstructing comprises the steps:

examining the content of each entry of the received bit vector;

if an examined entry contains a first value then performing the steps:
retrieving a value stored in a corresponding column of a previously received row of data, and
storing the retrieved value in a column of a receive buffer; and if an examined entry contains a second value then performing the steps:
retrieving a value stored in a corresponding column of the received row difference, and
storing the retrieved value in a column of a receive buffer.

30. A system for transmitting at least one row of data based on a query result comprising:
a client station configured to generate a query and transmit the query to said client station; and
a remotely located server for receiving the query generated by the client station, said server being configured to:
generate a query result having at least one row of data, based on the received query,
transmit a first row of data of the query result to said client station,
calculate row differences between successive rows of data contained in the query result, and
transmit the calculated row differences to said client station;
said client station being further configured to reconstruct the query result based on the received row of data and the received row differences.

31. The system of claim 30 wherein said server is further configured to calculate the row differences between successive rows of data contained in the query result by performing the steps:
scanning a currently active row of data from the query result;
scanning a previous row of data from the query result;
comparing the content of each column in the currently active row of data to the content of each corresponding column in the first row of data;
if the content of a compared column in the currently active row of data is equal to the content of the corresponding column of the previous row of data, then incrementing the value of a counter that indicates the number of repeated value columns detected in the currently active row of data; and
if the content of a compared column in the currently active row of data does not equal the content of the corresponding column of the previous row of data, then performing the step of transmitting the calculated row differences.

32. The system of claim 31 wherein said server is further configured to transmit the calculated row differences by performing the steps:
determining if the content of all columns in the currently active row of data equal the content of all corresponding columns in the previous row of data; and
if all the columns are equal, then transmitting a flag value to the client station to indicate that all columns in the currently active row are common to the columns in the previous row of data.

33. The system of claim 31 wherein said server is further configured transmit the calculated row differences by performing the steps:
transmitting the counter to said client station;
transmitting the current column to the client station; and
transmitting all subsequent columns in the currently active row of data to the client station.

34. The system of claim 33 wherein said client station is further configured to reconstruct the query result by performing the steps:
copying a plurality of columns, equal to the value of the received counter, from a previously received row of data to a buffer; and
appending the received subsequent columns to the plurality of columns stored in the buffer in order to reconstruct the currently active row of the query result.

35. The system of claim 30 wherein said server is further configured to calculate the row differences between successive rows of data contained in the query result by performing the steps:
scanning a currently active row of data from the query result;
scanning a previous row of data from the query result;
generating a bit vector containing a plurality of entries corresponding to the number of columns in the currently active row of data;
comparing the content of each column in the currently active row of data to the content of each corresponding column in the previous row of data;
if the content of a compared column in the currently active row of data is equal to the content of a corresponding column in the previous row of data, then storing a first value in the corresponding entry of the bit vector; and
if the content of a compared column in the currently active row of data does not equal the content of the corresponding column of the previous row of data, then storing a second value in the corresponding entry of the bit vector.

36. The system of claim 35 wherein said server is further configured to transmit the calculated row differences by performing the steps:
transmitting the bit vector to the client station; and
transmitting columns from the currently active row of data that are not equal to corresponding columns in the previous row of data to the client station.

37. The system of claim 36 wherein said client station is further configured to reconstruct the query result by performing the steps:
examining the content of each entry of the received bit vector;
if an examined entry contains a first value then performing the steps:
retrieving a value stored in a corresponding column of the previously received row of data, and
storing the retrieved value in a column of a buffer; and
if an examined entry contains a second value then performing the steps:
retrieving a value stored in a corresponding column of the received row difference, and
storing the retrieved value in a column of a buffer.

* * * * *